United States Patent

Huang

(10) Patent No.: US 9,774,920 B2
(45) Date of Patent: Sep. 26, 2017

(54) STREAMING DEVICE AND METHOD FOR PROCESSING MULTIPLE SIGNALS

(71) Applicants: NANNING FUGUI PRECISION INDUSTRIAL CO., LTD., Nanning (CN); HON HAI PRECISION INDUSTRY CO., LTD., New Taipei (TW)

(72) Inventor: Rui-Tang Huang, New Taipei (TW)

(73) Assignees: NANNING FUGUI PRECISION INDUSTRIAL CO., LTD., Nanning (CN); HON HAI PRECISION INDUSTRY CO., LTD., New Taipei (TW)

( * ) Notice: Subject to any disclaimer, the term of this patent is extended or adjusted under 35 U.S.C. 154(b) by 0 days.

(21) Appl. No.: 14/995,427

(22) Filed: Jan. 14, 2016

(65) Prior Publication Data

US 2017/0164066 A1    Jun. 8, 2017

(30) Foreign Application Priority Data

Dec. 2, 2015  (TW) .............................. 104140419 A

(51) Int. Cl.
H04N 7/173     (2011.01)
H04N 21/6379   (2011.01)
H04N 21/2365   (2011.01)
H04N 21/43     (2011.01)
H04N 21/443    (2011.01)
H04N 21/239    (2011.01)
H04N 21/6373   (2011.01)

(52) U.S. Cl.
CPC ..... *H04N 21/6379* (2013.01); *H04N 21/2365* (2013.01); *H04N 21/2393* (2013.01); *H04N 21/4307* (2013.01); *H04N 21/4438* (2013.01); *H04N 21/6373* (2013.01)

(58) Field of Classification Search
CPC ........... H04N 21/6379; H04N 21/2365; H04N 21/43; H04N 21/443; H04N 21/239; H04N 21/6373
See application file for complete search history.

(56) References Cited

U.S. PATENT DOCUMENTS 6,539,545 B1 * 3/2003 Dureau .............. H04N 7/17336
                                                         348/14.07
9,043,443 B2    5/2015 Yang

FOREIGN PATENT DOCUMENTS

TW        201442497     11/2014

* cited by examiner

*Primary Examiner* — John Schnurr
(74) *Attorney, Agent, or Firm* — Steven Reiss

(57) ABSTRACT

A streaming device includes a signal source to supply a first streaming signal and a second streaming signal, a server coupled to the signal source to process the first streaming signal and the second streaming signal; and at least one client. The client is used to decode the first streaming signal and the second streaming signal into a first window and a second window. The server can read an adjustment to the first window and the second window and output different signals to the client according to the adjustment.

12 Claims, 6 Drawing Sheets

STREAMING DEVICE AND METHOD FOR PROCESSING MULTIPLE SIGNALS

FIELD

The subject matter herein generally relates to a method for processing multiple signals and a streaming device using the same.

BACKGROUND

Audiences may receive multiple streaming signals when they are watching a live stream. The audiences can adjust different videos and audios as they preferred.

BRIEF DESCRIPTION OF THE DRAWINGS

Implementations of the present technology will now be described, by way of example only, with reference to the attached figures.

DETAILED DESCRIPTION

Figure 1:
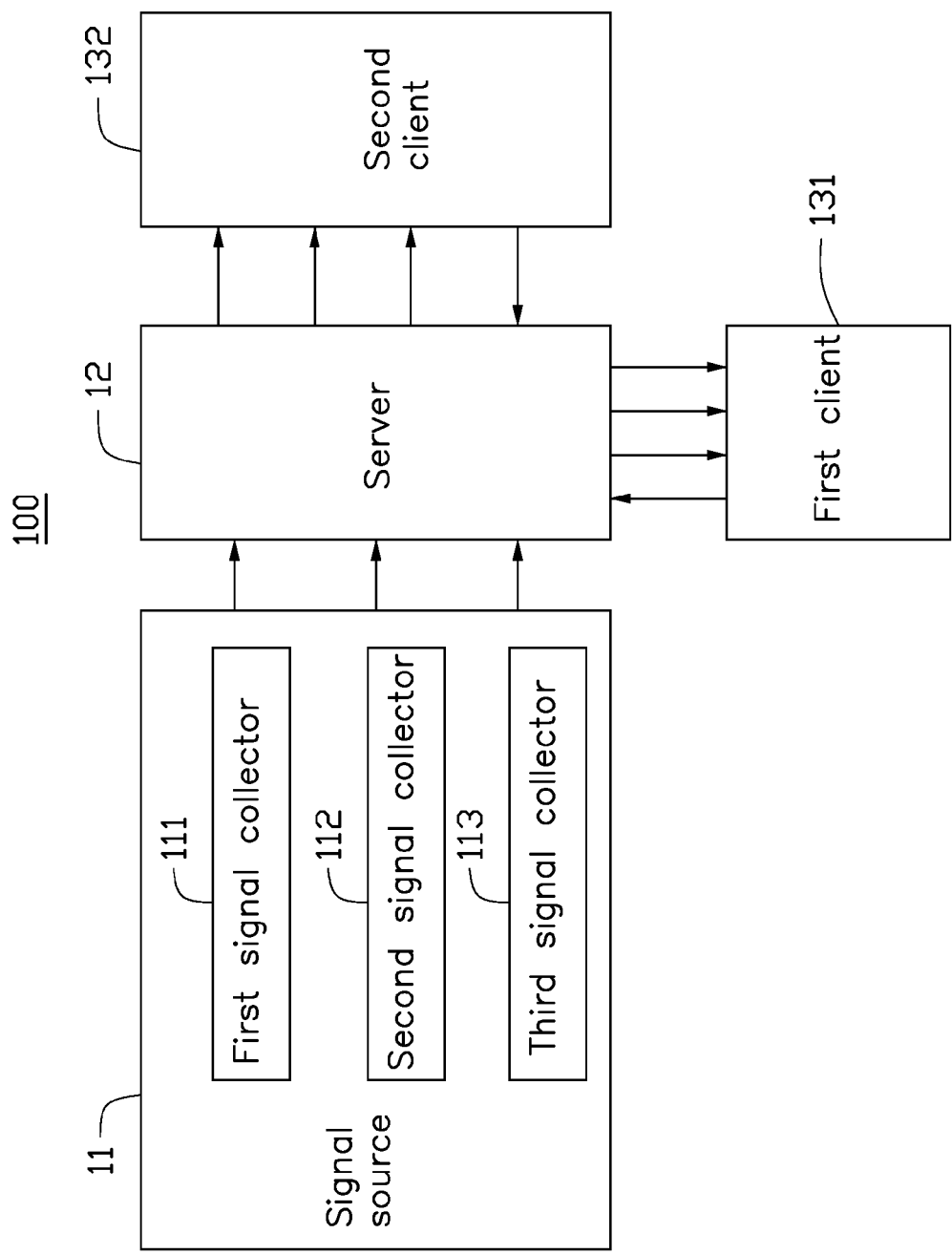
FIG. 1 is a block diagram of an embodiment of a streaming device of the present disclosure.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures and components have not been described in detail so as not to obscure the related relevant feature being described. Also, the description is not to be considered as limiting the scope of the embodiments described herein. The drawings are not necessarily to scale and the proportions of certain parts may be exaggerated to better illustrate details and features of the present disclosure.

Several definitions that apply throughout this disclosure will now be presented.

The term "coupled" is defined as connected, whether directly or indirectly through intervening components, and is not necessarily limited to physical connections. The connection can be such that the objects are permanently coupled or releasably coupled. The term "comprising," when utilized, means "including, but not necessarily limited to"; it specifically indicates open-ended inclusion or membership in the so-described combination, group, series and the like.

The disclosure will now be described in relation to a streaming device 100.

FIG. 1 illustrates an embodiment of the streaming device 100. The streaming device 100 can comprise a signal source 11, a server 12, a first client 131, and a second client 132.

The signal source 11 is coupled to the server 12. The signal source 11 supplies a first streaming signal, a second streaming signal, and a third streaming signal to the server 12.

In at least one embodiment, the signal source 11 can comprise a first signal collector 111, a second signal collector 112, and a third signal collector 113. The first signal collector 111 is used to encode a first video and a first audio into a first streaming signal. The second signal collector 112 is used to encode a second video and a second audio into a second streaming signal. The third signal collector 113 is used to encode a third video and a third audio into a third streaming signal.

The server 12 is used to process the first streaming signal, the second streaming signal, and the third streaming signal. The server 12 supplies the first through third streaming signals of different bitrates for the first client 131 and the second client 132.

In at least one embodiment, the first client 131 comprises a first display of a first resolution. The server 12 receives a request from the first client 131. The server 12 outputs a signal of a first bitrate according to the first resolution.

Similarly, the second client 132 comprises a second display of a second resolution. The server 12 receives a request from the second client 132. The server 12 outputs a signal of a second bitrate according to the second resolution.

In at least one embodiment, the first client 131 can be a notebook and the second client 132 can be a tablet.

In other embodiments, the first client 131 and the second client 132 can be other apparatus and the server 12 can outputs signals to the first client 131 and the second client 132 according to other parameters, such as a specification of a central processing unit of the first client 131 and the second client 132.

Figure 3:
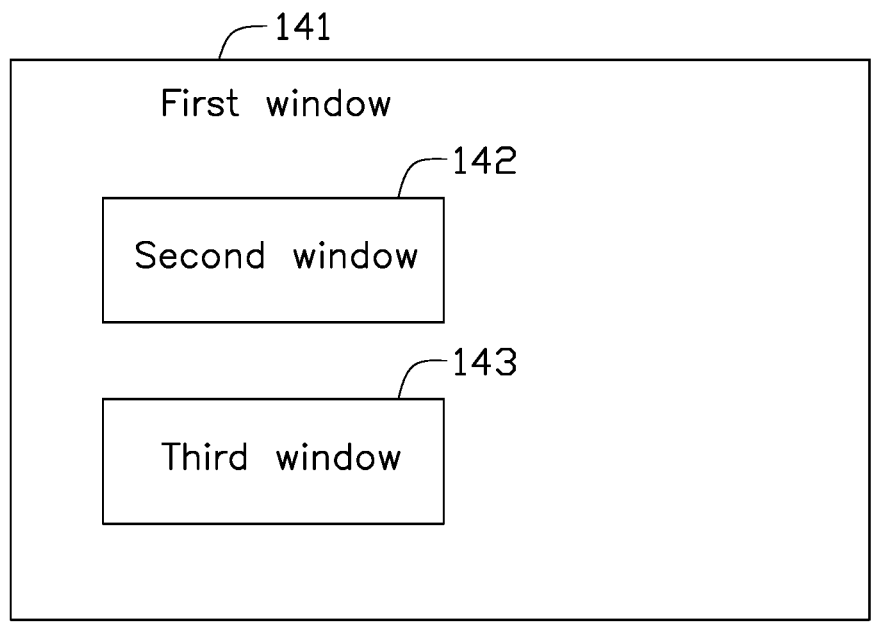
FIG. 3 is a diagram of first through third windows in at least one embodiment of the streaming device of FIG. 1.

FIG. 3 illustrates the first client 131 receives the first through third streaming signal and forms a first window 141 which includes the first video and the first audio, a second window 142 which includes the second video and the second audio, and a third window 142 which includes the third video and the third audio. The first window 141 is supposed to be a primary window. The second window 142 and the third window 143 are secondary windows. Positions of the first through third windows 141-143 are described by the server 12.

In at least one embodiment, the server 12 receives the requests from the first client 131 and the second client 132 and adjusts a first parameter of the first window 141, a second parameter of the second window 142, and a third parameter of the third window 143. The first through third parameter can comprise but is not limited to bitrates and positions of the first through third windows 141-143.

Figure 4:
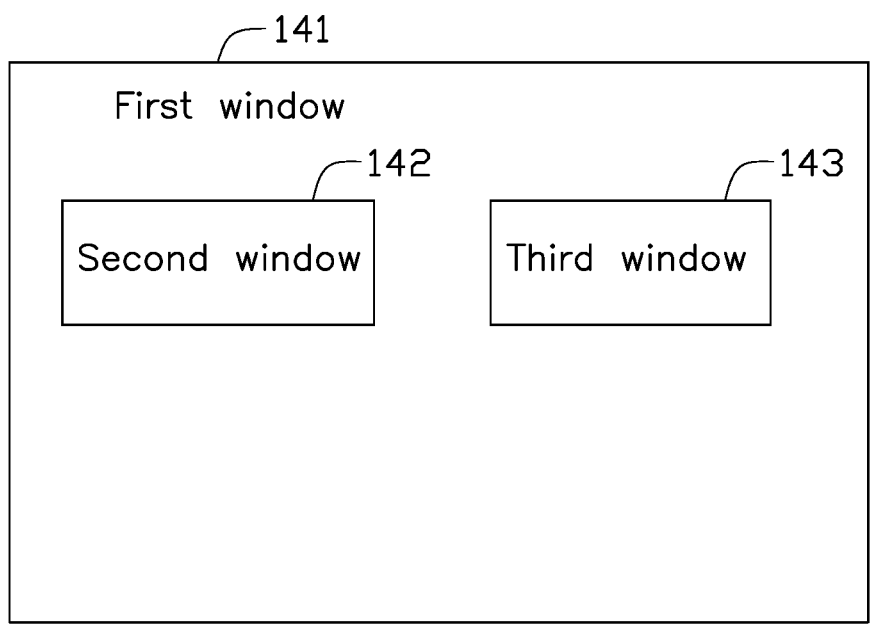
FIG. 4 is a diagram of the first through third windows which have been adjusted by a user.

FIG. 4 illustrates the first through third windows 141-143 after adjustment. The first window 141 is still the primary window after adjustment. A position of the second window 142 is not changed. A position of the second window 143 is changed.

Figure 5:
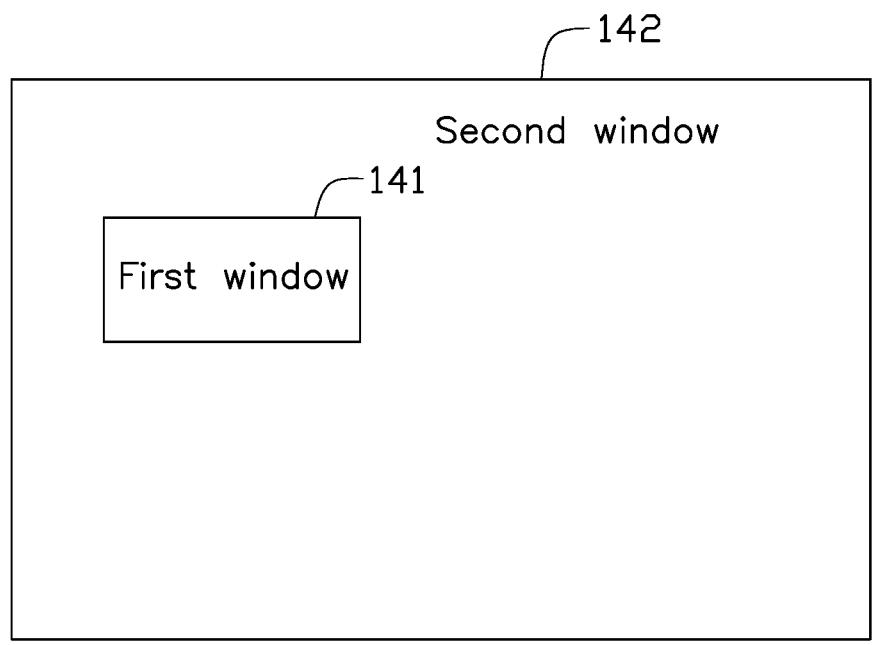
FIG. 5 is a diagram of the first through third windows which have been adjusted by another user.

FIG. 5 illustrates the first through third windows 141-143 after another adjustment. The second window 142 is set as the primary window. The first window 141 is set as a secondary window. The third window 143 is closed.

The server 12 collects parameters of each window in every preset cycle and generates a statistical result.

In at least one embodiment, the server 12 mixes the first through third streaming signals according to parameters of the statistical result and sends a fourth streaming signal to the clients when the statistical result meets a first condition. When the statistical result does not meet the first condition, the server 12 continues outputting the first through third streaming signals to the clients.

Figure 2:
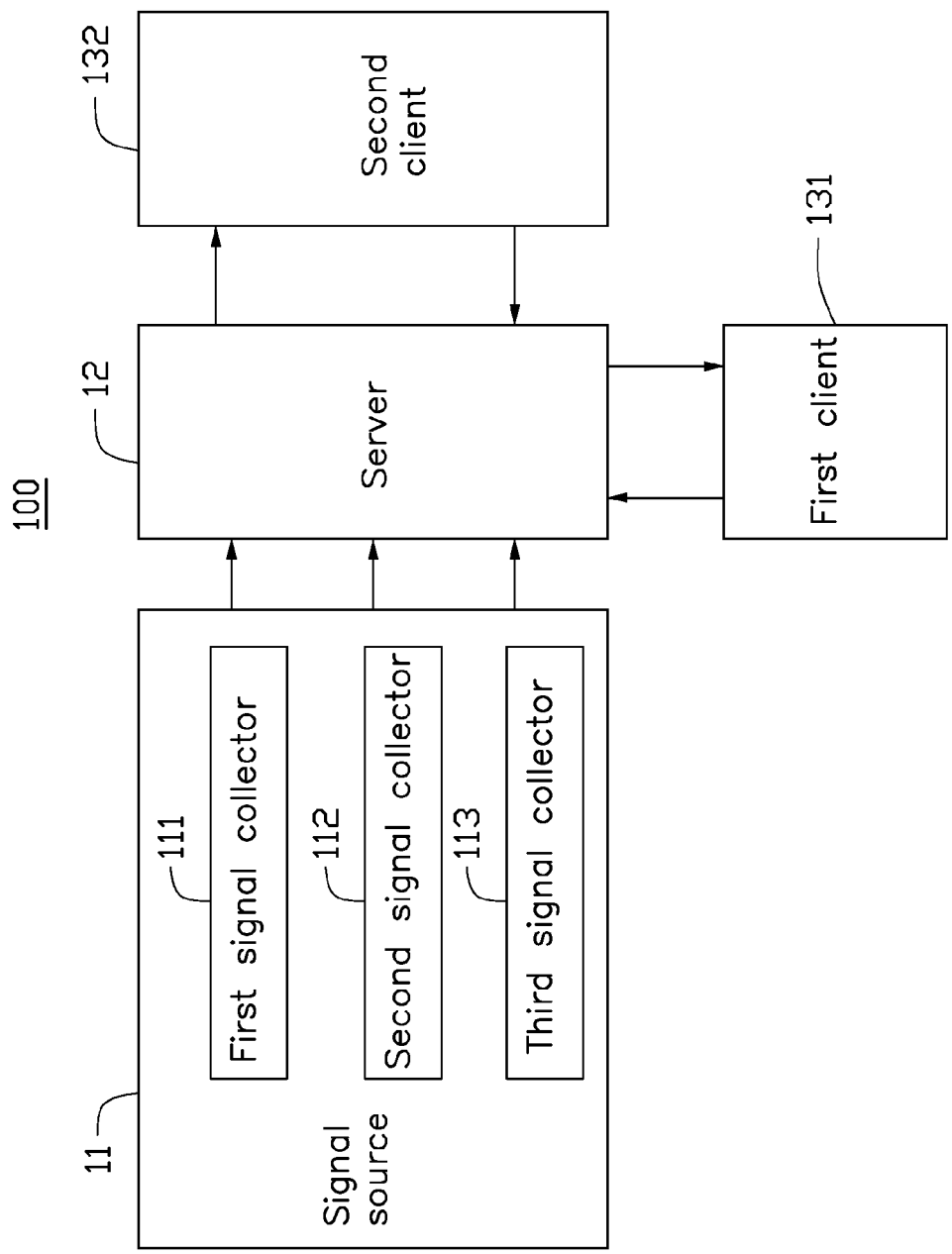
FIG. 2 is a block diagram of the streaming device in FIG. 1 showing the streaming device is outputting a fourth streaming signal.

FIG. 2 illustrates the server 12 outputting the fourth streaming signal to one client.

In at least one embodiment, one cycle lasts ten seconds. A time of one cycle can be adjusted in other embodiments.

In at least one embodiment, the server 12 can be used to determine whether parameters of the first through third windows in the client 131 are the same to parameters of the first through third windows in the client 132. When the parameters of the first through third windows of the first client 131 are the same to parameters of the first through third windows of the second client 132 and at the same time both of the first client 131 and the second client 132 do not refuse an automatic adjustment, the server 12 outputs the fourth streaming signal to the first client 131 and the second client 132.

In at least one embodiment, when the parameters of the first through third windows of the first client 131 are the same to parameters of the first through third windows of the second client 132 and at the same time both of the first client 131 and the second client 132 do not refuse an automatic adjustment, the server 12 mixes the first through third streaming signals into a fifth streaming signal according to parameters of the first through third windows of the first client 131 and outputs the fifth streaming signal to the first client 131. At the same time, the server 12 mixes the first through third streaming signals into a sixth streaming signal according to parameters of the first through third windows of the second client 132 and outputs the sixth streaming signal to the second client 132.

When one of the first client 131 and the second client 132 refuses the automatic adjustment, the server 12 continues outputting the first through third streaming signals to the one which refuses the automatic adjustment.

In other embodiments, the server 12 can have a plurality of clients. The server can calculates all used adjustment and selects a highest usage adjustment to mix the first through third streaming signals.

Figure 6:
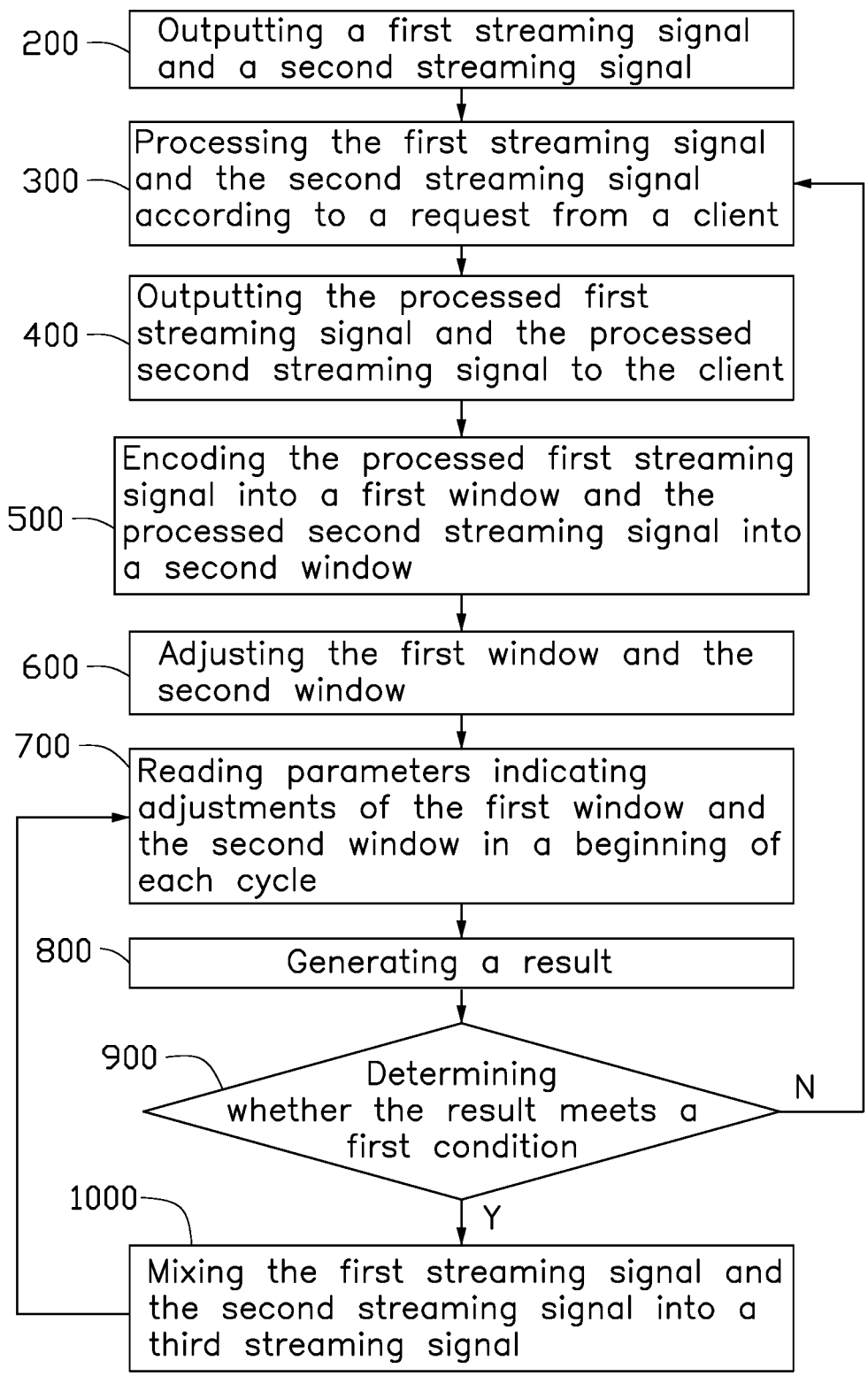
FIG. 6 is a flow chart of an embodiment of a method for processing multiple signals.

FIG. 6 illustrates a flowchart of a method to process multiple signals. The example method is provided by way of example, as there are a variety of ways to carry out the method. The method described below can be carried out using the configurations illustrated in FIGS. 1-5, for example, and various elements of these figures are referenced in explaining the example method. Each block shown in FIG. 6 represents one or more processes, methods, or subroutines carried out in the example method. Furthermore, the illustrated order of blocks is by example only, and the order of the blocks can be changed. Additional blocks can be added or fewer blocks can be utilized, without departing from this disclosure. The example method can begin at block 200.

At block 200, a signal source outputs a first streaming signal and a second streaming signal.

At block 300, a server processes the first streaming signal and the second streaming signal from the signal source.

At block 400, the server outputs processed first and second streaming signals according to a request from the client.

At block 500, the client encodes the processed first streaming signal and generates a first window comprising a first video and a first audio, the client encodes the processed second streaming signal and generates a second window comprising a second video and a second audio.

At block 600, the client adjusts the first window and the second window.

At block 700, the server reads parameters indicating adjustments of the first window and the second window in a beginning of each cycle.

At block 800, the server generates a result.

At block 900, the server determines whether the result meets a first condition. When the results meets the first condition, return to block 300. When the result does not meet the first condition, go to block 1000.

At block 1000, the server mixes the first streaming signal and the second streaming signal into a third streaming signal according to the parameters.

While the disclosure has been described by way of example and in terms of the embodiment, it is to be understood that the disclosure is not limited thereto. On the contrary, it is intended to cover various modifications and similar arrangements as would be apparent to those skilled in the art. Therefore, the range of the appended claims should be accorded the broadest interpretation so as to encompass all such modifications and similar arrangements.

What is claimed is:

1. A streaming device comprising:
   a signal source to supply a first streaming signal and a second streaming signal;
   a server coupled to the signal source to process the first streaming signal and the second streaming signal;
   at least one client configured to encode signals from the server into different windows comprising videos and audios, wherein the different windows can be adjusted and the server outputs different signals to the at least one client according to adjustments of the different windows; and
   wherein the server outputs the processed first streaming signal and the processed second streaming signal to the at least one client according to a request from the at least one client, the at least one client encodes the processed first streaming signal and the processing second streaming signal, the processed first streaming signal is encoded into a first window comprising a first video and a first audio, the processed first streaming signal is encoded into a second window comprising a second video and a second audio, the at least one client adjusts parameters of the first and second window, the server reads an adjustment of the parameters of the first and second window and generates a result, when the result meets a preset condition, the server mixes the first streaming signal and the second streaming signal into a single streaming signal and outputs the single streaming signal to the at least one client, when the result does not meet the preset condition, the server continues outputting the processed first streaming signal and the processed second streaming signal to the at least one client.

2. The streaming device as claim 1, wherein the signal source comprises a first signal collector and a second collector, the first signal collector is used to encode a first video and a first audio into the first streaming signal, the second signal collector is used to encode a second video and a second audio into the second streaming signal.

3. The streaming device as claim 2, wherein the signal source comprises a third signal collector, the third signal collector is used to encode a third video and a third audio into a third streaming signal.

4. The streaming device as claim 1, wherein the streaming device comprises a first client, the streaming device receives a request from the first client and process the first streaming signal and the second streaming signal according to the request of the first client.

5. The streaming device as claim 4, wherein the streaming device comprises a second client, the streaming device receives a request from the second client and process the first streaming signal and the second streaming signal according to the request of the second client.

6. The streaming device as claim 1, wherein the parameters comprises positions of the first and second windows.

7. The streaming device as claim 1, wherein the parameters comprises bitrates of the first and second windows.

8. The streaming device as claim 1, wherein the server reads the adjustment of the parameters of the first and second window and generates the result at the beginning of every cycle.

9. The streaming device as claim 8, wherein each cycle lasts ten seconds.

10. The streaming device as claim 1, wherein the preset condition comprises that the at least one client do not refuse an automatic adjustment from the server.

11. The streaming device as claim 10, wherein the automatic adjustment comprises the server mixes the first streaming signal and the second streaming signal into the single streaming signal and outputs the single streaming signal to the at least one client.

12. A method for processing multiple signals, comprising:
outputting a first streaming signal and a second streaming signal by a signal source;
processing the first streaming signal and the second streaming signal according to a request from a client;
outputting the processed first streaming signal and the processed second streaming signal to the client;
encoding the processed first streaming signal into a first window and the processed second streaming signal into a second window;
adjusting the first window and the second window;
reading parameters indicating adjustments of the first window and the second window in a beginning of each cycle;
generating a result;
determining whether the result meets a first condition, when the result does not meet the first condition, the server mixes the first streaming signal and the second streaming signal into a third streaming signal.

* * * * *